United States Patent
Yoshikawa

(10) Patent No.: US 8,861,240 B2
(45) Date of Patent: Oct. 14, 2014

(54) POWER CONVERTER

(71) Applicant: Fuji Electric Co., Ltd., Kawasaki (JP)

(72) Inventor: Koh Yoshikawa, Matsumoto (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 0 days.

(21) Appl. No.: 14/179,009

(22) Filed: Feb. 12, 2014

(65) Prior Publication Data

US 2014/0226384 A1 Aug. 14, 2014

(51) Int. Cl.
*H02M 7/48* (2006.01)

(52) U.S. Cl.
USPC ............................................. 363/132; 363/98

(58) Field of Classification Search
USPC ............................................. 323/95–98, 132
See application file for complete search history.

(56) References Cited

U.S. PATENT DOCUMENTS

| 5,003,246 A * | 3/1991 | Nadd | 323/349 |
|---|---|---|---|
| 8,649,197 B2 * | 2/2014 | Abe | 363/98 |
| 8,743,573 B2 * | 6/2014 | Balpe | 363/56.02 |
| 2010/0039843 A1 | 2/2010 | Takizawa | |
| 2011/0222325 A1 | 9/2011 | Komatsu | |
| 2011/0249479 A1 | 10/2011 | Capitaneanu et al. | |

FOREIGN PATENT DOCUMENTS

| JP | 2008-193779 A | 8/2008 |
|---|---|---|
| JP | 2011-193646 A | 9/2011 |
| JP | 2011-223867 A | 11/2011 |
| JP | 2012-253981 A | 12/2012 |

* cited by examiner

*Primary Examiner* — Jessica Han
(74) *Attorney, Agent, or Firm* — Rabin & Berdo, P.C.

(57) ABSTRACT

A power converter includes pairs of series-connected switching elements and, for each pair, a bidirectional switch that clamps the switching elements of the pair at the mid-point of a DC voltage that is supplied to the power converter. An abnormal voltage rise in a forward recovery process of the bidirectional switch is avoided by restraining an induced electromotive force developing across the bidirectional switch upon turning OFF of one of the semiconductor switching elements below the difference in voltage between the gate voltage at the start of the forward recovery process of the bidirectional switch and the gate threshold voltage that allows the maximum recovery current of the bidirectional switch to flow.

18 Claims, 12 Drawing Sheets

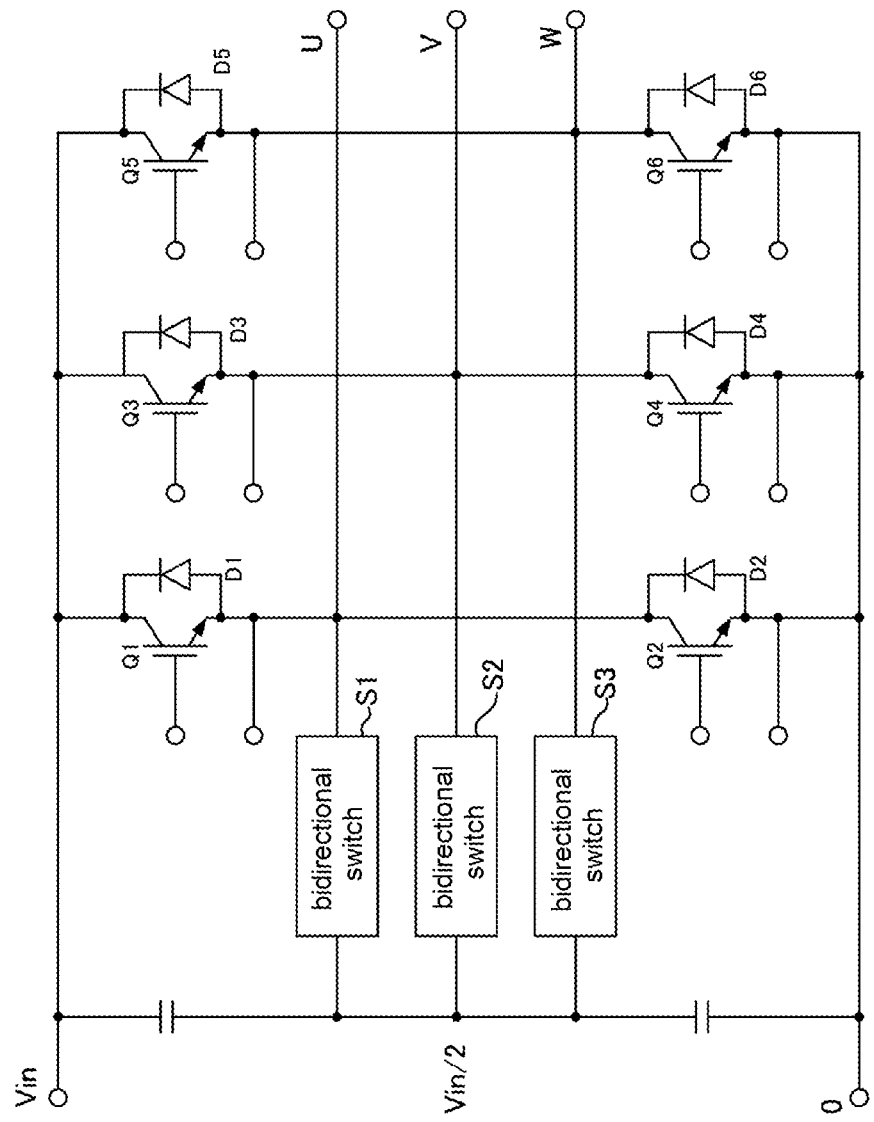

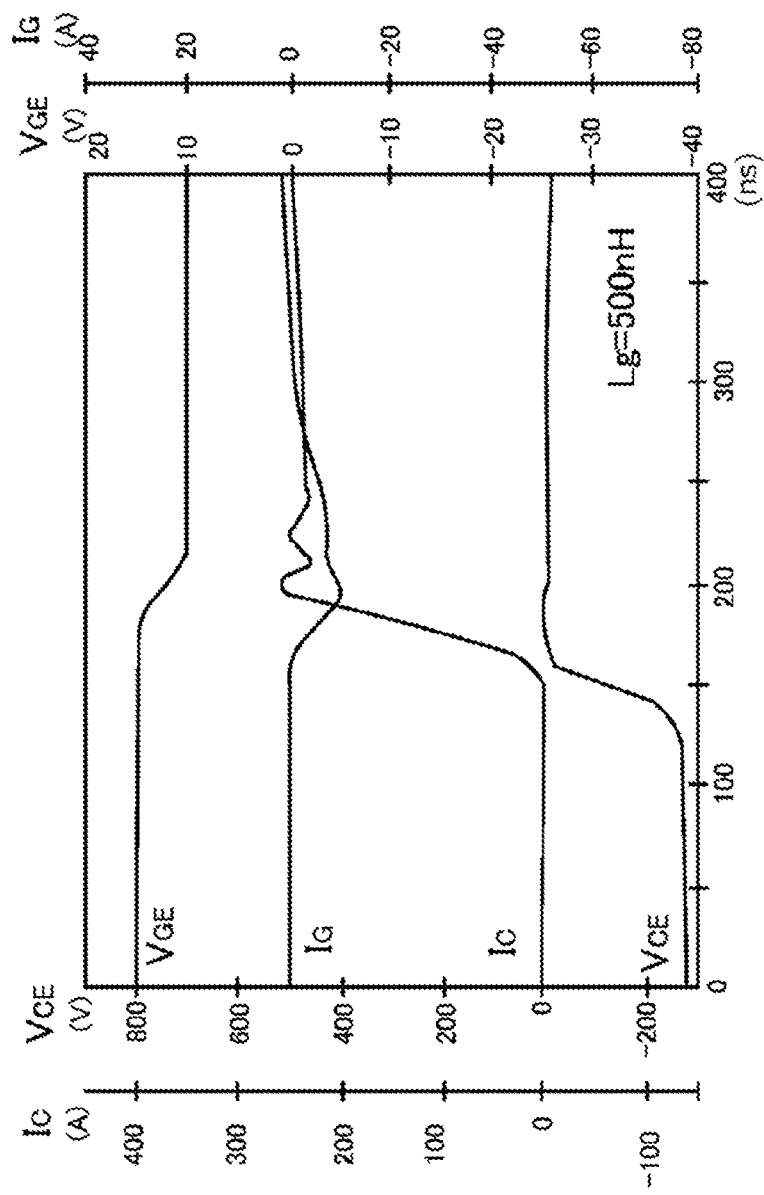

US 8,861,240 B2

POWER CONVERTER

CROSS-REFERENCE TO RELATED APPLICATION

This application is based on, and claims priority to, Japanese Patent Application No. 2013-025183, filed on Feb. 13, 2012, the contents of which are incorporated herein by reference.

BACKGROUND OF THE INVENTION

1. Field of the Invention

The present invention relates to a power converter with a neutral point clamped (NPC) circuit having a bidirectional switch interposed between a power supply and a series connection point of a pair of semiconductor switching elements.

2. Description of the Related Art

An inverter ON/OFF-drives a pair of series-connected semiconductor switching elements in a certain relation between the two to switch a DC voltage and is known for a small-sized and highly efficient power converter. Of the inverters, a multi-level inverter, typically a three level inverter, has many advantages for achieving a small-sized and highly efficient inverter over a common two-level inverter. The three level inverter is also called a neutral point clamped (NPC) inverter. The output voltages at the neutral point are three values of ±Vin/2, and 0 (zero), where Vin is the DC voltage. Consequently, output voltages of a three phase inverter using the three level inverter are five values of ±Vin, ±Vin/2, and 0. These values generate an AC output voltage having a nearly sinusoidal waveform. Multi-level inverters are disclosed in Patent Documents 1 and 2, for example.

FIG. 1 shows a schematic construction of an inverter with an advanced NPC circuit constructing a three-phase AC power converter. This inverter, which is a power converter, comprises three pairs of, i.e., six semiconductor switching elements Q1 thorough Q6, which can be IGBTs, for example. The semiconductor switching elements Q1 through Q6 form three sets of half-bridge circuits each set composed of a pair of series-connected semiconductor switching elements, and ON/OFF driven in a certain relationship with each other to switch the DC voltage Vin. These half-bridge circuits are connected in parallel to construct a three-phase AC full-bridge circuit. Each of the semiconductor switching elements Q1 through Q6 is provided with a respective one of free-wheeling diodes D1 through D6 connected in anti-parallel to the switching element. Between a power supply and a middle point of each half-bridge, each of three bidirectional switches S1 S2, and S3 is connected to clamp the semiconductor switching elements Q1 through Q6 to the neutral point, which is a point of middle potential Vin/2, of the DC voltage Vin.

These bidirectional switches S1 S2, and S3 are, as shown in FIG. 2A, for example, composed of anti-parallel-connected switching elements Q11 and Q12, which can be IGBTs, and diodes D11 and D12 connected in series to the respective switching elements Q11 and Q12. These diodes D11 and D12 assist a reverse withstand voltage of the diodes D11 and D12. Alternatively in recent many cases, the bidirectional switches S1, S2, and S3 are composed of switching elements Q21 and Q22 with an enhanced reverse withstand voltage, for example, reverse-blocking IGBTs, connected in anti-parallel as shown in FIG. 2B. This construction is disclosed in Patent Documents 3 and 4, for example.

The semiconductor switching elements Q1 through Q6 can be MOS-FETs as well as the IGBTs. The switches S1, S2 and S3 can be constructed with reverse-blocking MOS-FETs as well as with the reverse-blocking IGBTs.

Patent Document 1

Japanese Unexamined Patent Application Publication No. 2012-253981

Patent Document 2

Japanese Unexamined Patent Application Publication No. 2011-223867

Patent Document 3

Japanese Unexamined Patent Application Publication No. 2011-193646

Patent Document 4

Japanese Unexamined Patent Application Publication No. 2008-193779

With increase in a switching speed of the IGBTs and MOS-FETs, a problem has arisen about inductances in wiring at various places in an inverter having the NPC circuit. If a wiring inductance is large between the semiconductor switching elements Q1 through Q6, which can be IGBTs, and the bidirectional switches S1, S2, and S3, which can be reverse-blocking IGBTs, a surge voltage becomes high upon turning OFF of the semiconductor switching elements Q1 through Q6. As a consequence, high voltage capability is required by the semiconductor switching elements Q1 through Q6, which can be IGBTs, and by the bidirectional switches S1, S2, and S3, which can be reverse-blocking IGBTs.

This condition, however, invites problems of enlarged size and higher costs of the semiconductor switching elements, which can be IGBTs. Accordingly in a conventional technology, effort has been made to reduce a wiring inductance between the semiconductor switching elements and the bidirectional switches by containing the bidirectional switch and the pair of semiconductor switching elements composing a half-bridge in a single package to form a module.

In an inverter with a NPC circuit constructed as described above, it has been observed that when a turning OFF speed of the semiconductor switching elements Q1 through Q6 is fast, the bidirectional switch is heated up and breaks down upon turning OFF of the semiconductor switching elements Q1 through Q6. In order to avoid such a failure, it may be possible to cool the bidirectional switch with a large cooling device. But, the measure is of course not enough satisfactory.

SUMMARY OF THE INVENTION

The present invention has been made in view of the foregoing and an object of the present invention is to provide a power converter that effectively avoids breakdown of a bidirectional switch upon turning OFF of a semiconductor switching element even when a switching speed, or a turning OFF speed, of the semiconductor switching element is high.

The present invention has been made considering the behavior of the bidirectional switch in the turning OFF period of the semiconductor switching element. In the turning OFF period of the semiconductor switching element, the element, which can be a reverse-blocking IGBT or a reverse-blocking MOS-FET, composing the bidirectional switch operates in a diode mode. In this state, the reverse-blocking IGBT (or reverse-blocking MOS-FET) is in a state with the gate thereof positively biased opening the channel, and the reverse-blocking IGBT (or reverse-blocking MOS-FET) is changed over from a reversely biased state to a forwardly biased state as shown in FIG. 3A. FIGS. 3A and 3B show variation of voltage Vce developed across the reverse-blocking IGBT (or reverse-blocking MOS-FET) and current Ic flowing through the reverse-blocking IGBT (or reverse-blocking MOS-FET) in the process of turning OFF of the semiconductor switching element.

The operation mode of the reverse-blocking IGBT (or reverse-blocking MOS-FET) in the diode mode is an operation mode corresponding to forward recovery of a diode. When the turning OFF speed of the semiconductor switching element is fast in this operation mode, it has been confirmed that the voltage Vce across the reverse-blocking IGBT (or reverse-blocking MOS-FET) abnormally rises as shown in FIG. 3B. As a result, together with the increased current Ic through the reverse-blocking IGBT (or reverse-blocking MOS-FET), the energy loss in the reverse-blocking IGBT (or reverse-blocking MOS-FET) increases. The present invention has been made considering that such a phenomenon causes breakdown of the device.

A power converter of the invention basically comprises: a pair(s) of semiconductor switching elements that are connected in series to form a half-bridge and are ON/OFF-driven in certain relationship with each other to switch a DC voltage; free-wheeling diodes that are provided anti-parallel-connected with the respective switching elements; and a bidirectional switch that is interposed between a power supply and a middle point of the half-bridge to clamp the semiconductor switching element to a middle potential point of the DC voltage.

In an power converter of the invention in particular, an induced electromotive force generated in a forward recovery process of the bidirectional switch upon turning OFF of the semiconductor switching element is controlled below a difference between a gate voltage at a moment of start of the forward recovery process of the bidirectional switch and a gate threshold voltage that allows to flow maximum forward recovery current of the bidirectional switch.

Preferably, the semiconductor switching element is an IGBT or a MOS-FET, and the bidirectional switch is a pair of reverse-blocking IGBTs or a reverse-blocking MOS-FETs anti-parallel-connected with each other. The bidirectional switch can, of course, have a diode that is series-connected to the IGBT or the MOS-FET to enhance a withstand voltage, as well as the pair of IGBTs or MOS-FETs being anti-parallel connected with each other.

Specifically, the induced electromotive force generated in a forward recovery process of the bidirectional switch is obtained from a product of an inductance of the bidirectional switch and a forward recovery rate of the bidirectional switch depending on a turning OFF rate of the semiconductor switching element, and the induced electromotive force is made lower than the difference between the gate voltage and the gate threshold voltage.

A power converter of the invention having the basic construction as stated above, is designed to satisfy the following relationships when a delay time of collector voltage rise of the bidirectional switch in a forward recovery process is about three times of a time period in which a gate voltage Vg of the bidirectional switch at a moment of start of the forward recovery process of the bidirectional switch upon turning OFF of the semiconductor switching element falls down to a gate threshold voltage Vg(th):

$$Vg-Vg(th) \geq Ledi/dt(\beta/\gamma)\alpha$$

$$\alpha = 1-\exp[-tr/(RgCg)]$$

$$\beta = 1-\exp[-(2/9)tr/(RgCg)]$$

$$\gamma = 1-\exp[-(2/3)tr/(RgCg)]$$

wherein Le is an inductance of the bidirectional switch, di/dt is a time variation of a forward recovery current until a maximum forward recovery current is reached, tr is a time period until the maximum forward recovery current is reached, Rg is a gate resistance of the bidirectional switch, and Cg is a gate input capacitance of the bidirectional switch.

When the ratio $\beta/\gamma$ has a value from 1/3 to 1 in the range of a condition $0 < tr/(RgCg) < \infty$, the above condition reduces to:

$$Vg-Vg(th) \geq (1/3)Ledi/dt\alpha$$

$$\alpha = 1-\exp[-tr/(RgCg)].$$

Another converter of the present invention having the basic construction as stated above, is designed to satisfy the following relationships:

$$Vg-Vg(th) \geq Ledi/dt\alpha$$

$$\alpha = 1-\exp[-tr/(RgCg)].$$

This relation can be simply, $$Vg-Vg(th) \geq Ledi/dt$$

The relationships as stated above in the power converter are actualized by increasing a gate-emitter voltage or a gate-drain voltage of the bidirectional switch over a period of time variation of the forward recovery current from immediately before the forward recovery of the bidirectional switch.

More specifically, the gate-emitter voltage or the gate-drain voltage of the bidirectional switch is increased either by increasing a time constant of a gate circuit for the bidirectional switch; by interposing a capacitor between the gate and emitter or between the gate and drain of the bidirectional switch; or by adding an inductance component to the gate circuit of the bidirectional switch.

In a power converter having a construction as stated above, even though an induced electromotive force is generated due to the forward recovery of the bidirectional switch upon the turning OFF of the semiconductor switching element, the gate voltage of the bidirectional switch does not decrease below a voltage to turn the bidirectional switch OFF, and thus, the bidirectional switch is held in an ON state. In the period of varying the forward recovery current through the bidirectional switch upon the turning OFF of the semiconductor switching element, the gate voltage of the bidirectional switch does not reach such a value that is necessary for driving the forward recovery current. Consequently, a collector voltage applied on the bidirectional switch does not rise abruptly. Therefore, abnormal voltage rise in the forward recovery process is avoided.

Consequently, even though the turning OFF speed of the semiconductor switching element is high, a power converter of the invention effectively avoids breakdown of the bidirectional switch due to the induced electromotive force in the forward recovery process of the bidirectional switch upon turning OFF of the semiconductor switching element. Therefore, a power converter exhibiting high efficiency is achieved without inviting such problems as increase in size and cost of switching devices.

BRIEF DESCRIPTION OF DRAWINGS

FIG. 1 shows a schematic construction of a three phase power converter, which is an inverter having an advanced NPC circuit, according to an embodiment of the present invention;

FIGS. 10A, 10B, and 10C show variation of voltage and current when the abnormal voltage in a forward recovery is avoided by increasing a gate inductance of the bidirectional switch S1.

DETAILED DESCRIPTION OF THE INVENTION

The following describes in detail a power converter according to an embodiment of the invention with reference to accompanying drawings.

The power converter of this embodiment is an inverter for three phase AC power with an advanced NPC circuit. This inverter, which is a power converter, comprises basically three pairs of, i.e. six, semiconductor switching elements Q1 through Q6, which are IGBTs, for example, each pair connected in series as shown in FIG. 1, for forming three sets of half-bridge circuits. Each of the semiconductor switching elements Q1 through Q6 is provided with respective freewheeling diodes D1 through D6 connected anti-parallel with the switching elements. Bidirectional switches S1, S2, and S3 are disposed between a power supply and the middle point of the half-bridge.

Figure 2A:
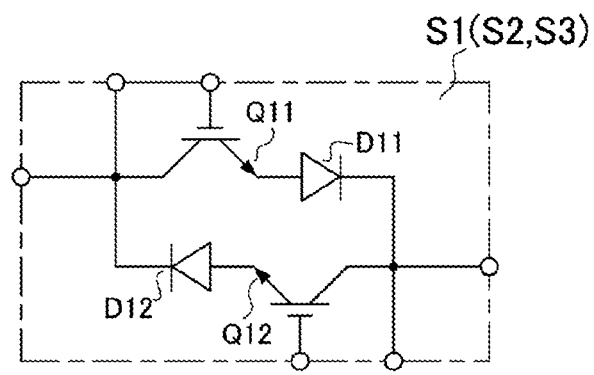
FIG. 2A shows an example of construction of a bidirectional switch in the power converter shown in FIG. 1.
Figure 2B:
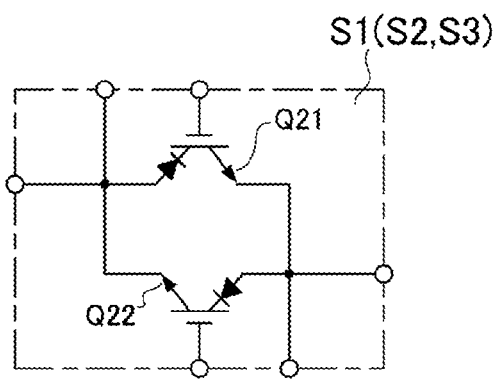
FIG. 2B shows another example of construction of a bidirectional switch in the power converter shown in FIG. 1.
Figure 3A:
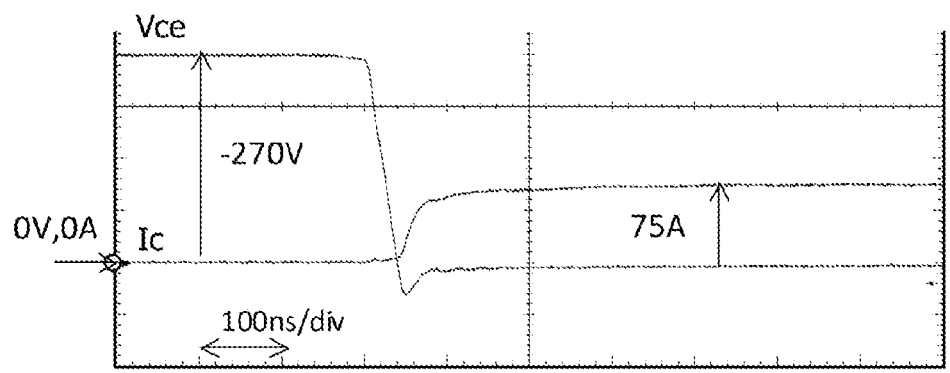
FIG. 3A shows an example of variation of a voltage Vce across a bidirectional switch, which is a reverse blocking IGBT, and a current Ic through the reverse blocking IGBT upon turning OFF of a semiconductor switching element.
Figure 3B:
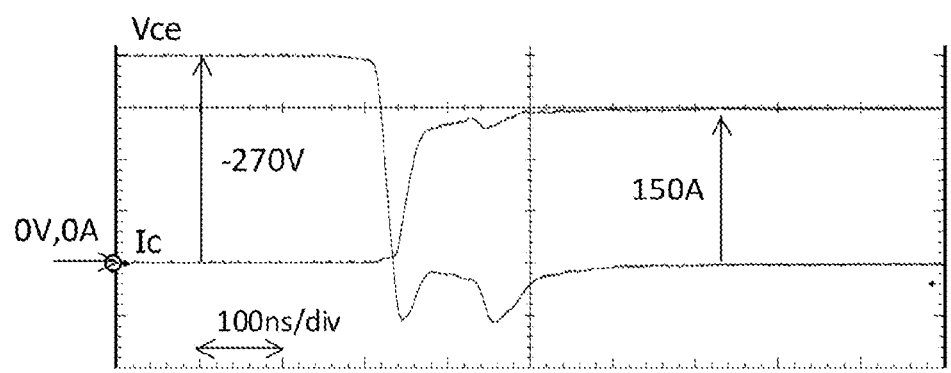
FIG. 3B shows another example of variation of a voltage Vce across a bidirectional switch, which is a reverse blocking IGBT, and a current Ic through the reverse blocking IGBT upon turning OFF of a semiconductor switching element.
Figure 4:
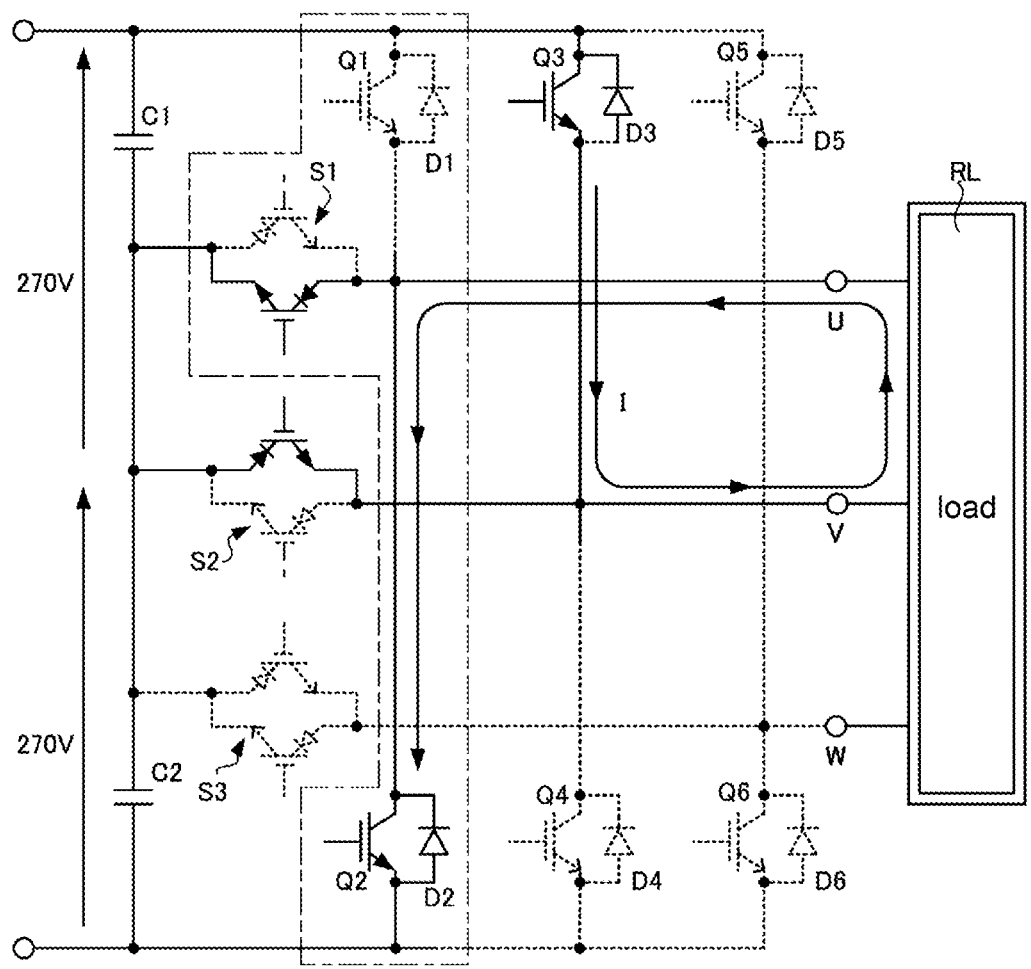
FIG. 4 is a circuit diagram explaining the operation of the bidirectional switch S1 upon turning OFF of the semiconductor switching element Q2.

Now, concerning one phase, for example, U-phase, operation of the bidirectional switch S1 upon turning OFF of the semiconductor switching element Q2, which is an IGBT, is described. A situation is considered as shown in FIG. 4 in which a power is supplied between the U- and V-phases of the load RL upon ON operation of the U-phase semiconductor switching element Q2 and the V-phase semiconductor switching element Q3. This situation can be equivalently represented by FIG. 5.

Figure 5:
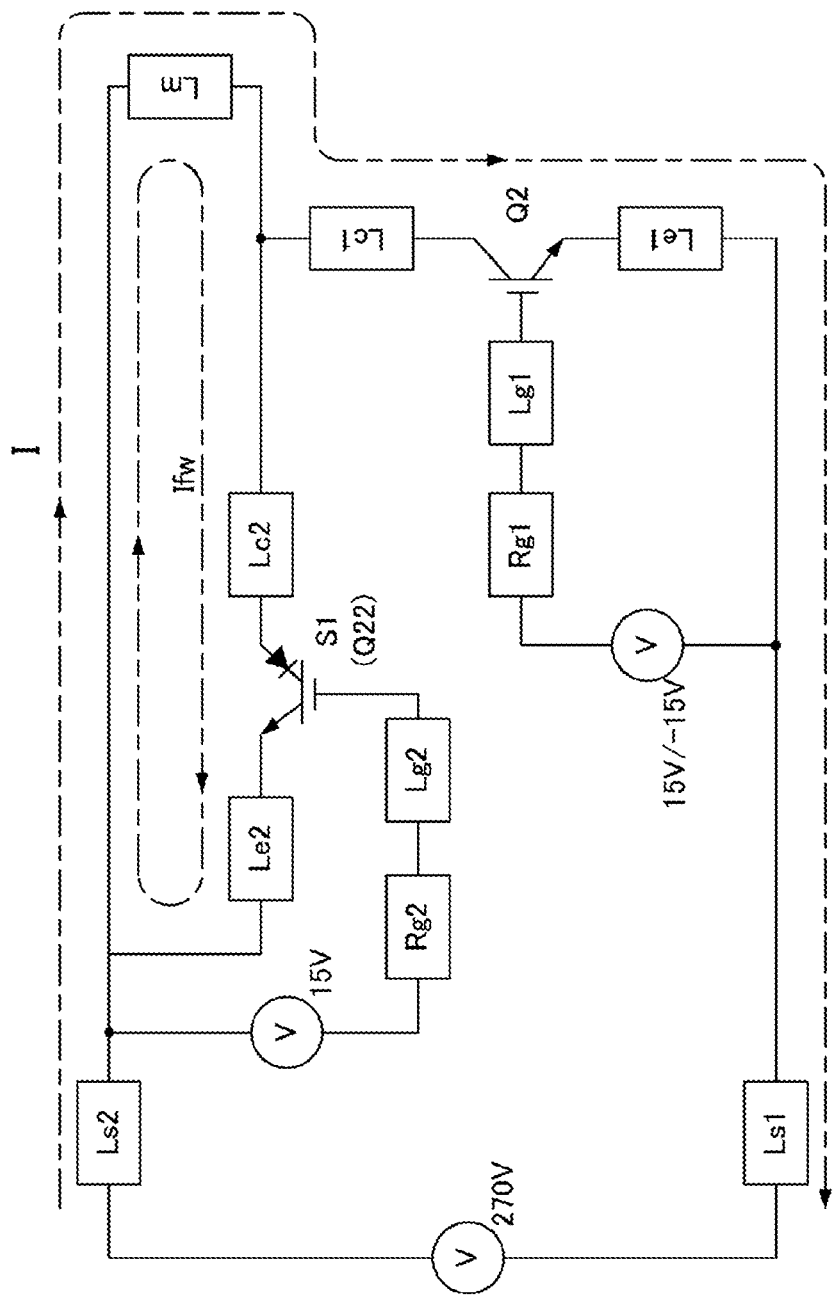
FIG. 5 shows an equivalent circuit of a part of the circuit of FIG. 4.

In FIG. 5, the symbol Lm represents a main inductance of the load RL, the symbols Le1, Lc1, and Lg1 represent inductances of the emitter, collector, and gate of the semiconductor switching element Q2, which is an IGBT in this case, and the symbol Rg1 represents the gate resistance of the semiconductor switching element Q2, which is an IGBT. The symbols Le2, Lc2, and Lg2 represent inductances of the emitter, collector, and gate of the element Q22, which is a reverse-blocking IGBT in this case, composing the bidirectional switch S1, and the symbol Rg2 represents the gate resistance of the element Q22, which is a reverse-blocking IGBT. The symbol Ls1 and Ls2 represent wiring inductances of the U-phase and V-phase of a power supply lines.

The following explains about abnormal voltage rise that develops in a forward recovery process of the element Q22, which is a reverse-blocking IGBT, with reference to FIG. 5. In an ON state of the semiconductor switching element Q2, which is an IGBT, or before turning OFF, the semiconductor switching element Q2, which is an IGBT, and the element Q22, which is a reverse-blocking IGBT, are both subjected to a gate voltage of +15 V. The main current I flows through the load RL and the semiconductor switching element Q2, which is an IGBT. In this state, the element Q22, which is a reverse-blocking IGBT, is subjected to a reverse voltage between the collector and emitter thereof and the element Q22, which is a reverse-blocking IGBT, is in an OFF state.

From this state, when a gate voltage of −15 V is applied to the semiconductor switching element Q2, which is an IGBT, and the semiconductor switching element Q2, which is an IGBT, starts turning OFF, the collector voltage of the semiconductor switching element Q2, which is an IGBT, begins to rise. When the collector voltage of the semiconductor switching element Q2, which is an IGBT, exceeds a power supply voltage of the power converter, which is 270 V in this case, the element Q22, which is a reverse-blocking IGBT, is subjected to a forward voltage. Thus, the current I that has been flowing through the semiconductor switching element Q2, which is an IGBT, becomes a forward recovery current through the element Q22, which is a reverse-blocking IGBT. The forward recovery current flowing in through the element Q22, which is a reverse-blocking IGBT, becomes circulating current Ifw through the main inductance Lm and the element Q22, which is a reverse-blocking IGBT.

The variation with time di/dt of the circulating current Ifw, which is the forward recovery current, until reaching the maximum value, the maximum forward recovery current, is called "a turn OFF di/dt" or "a forward recovery di/dt". The turn OFF di/dt or the forward recovery di/dt is solely determined by the turning OFF speed of the semiconductor switching element Q2, which is an IGBT. An induced electromotive force is generated across the element Q22, which is a reverse-blocking IGBT, so that the emitter potential of the element Q22, which is a reverse-blocking IGBT, rises depending on the turn OFF di/dt, or the forward recovery di/dt, and the emitter inductance Le2 of the element Q22, which is a reverse-blocking IGBT.

Then, the voltage Vge appearing between the gate and emitter of the element Q22, which is a reverse-blocking IGBT, decreases by the induced electromotive force ΔV from the gate voltage Vg, which is 15 V here, applied to the gate of the element Q22, which is a reverse-blocking IGBT. As a result, a negative current Ig, which is a current flowing out of the gate, arises at the gate of the element Q22, which is a reverse-blocking IGBT. If the induced electromotive force ΔV is large, the element Q22, which is a reverse-blocking IGBT, begins to turn OFF.

At this time, even when the circulation current reaches the maximum forward recovery current and the turn OFF di/dt, i.e. forward recovery di/dt, becomes zero, the negative gate current Ig continues to flow for a period of time determined by the circuit constant corresponding to the gate resistance and a gate capacitance of the element Q22, which is a reverse-blocking IGBT. Thus, the turning OFF operation continues in the element Q22, which is a reverse-blocking IGBT.

During the period when the negative gate current Ig continues flowing, a feedback capacitance Cgc in the element Q22, which is a reverse-blocking IGBT, continues discharging. The element Q22, which is a reverse-blocking IGBT, gets into a state of so-called minor period in which the gate-emitter voltage Vge thereof settles to a constant value. Then, collector current of the element Q22, which is a reverse-blocking IGBT, increases according to the relationship between a gate current and a displacement current as shown by the following equation.

The gate current Ig varies as represented by the formula (1) below depending on the gate-emitter voltage Vge of the element Q22, which is a reverse-blocking IGBT, and the time variation of the feedback capacitance Cgc in the discharging process:

$$Ig = Vge\, dCgc/dt \quad (1)$$

The feedback capacitance Cgc of the element Q22, which is a reverse-blocking IGBT, is represented by the formula (2) below depending on the device structure:

$$Cgc = CoxCfd/(Cox+Cfd)$$

$$Cox = \epsilon ox S/tox$$

$$Cfd = \epsilon si S/d, \quad (2)$$

where ϵsi is a permittivity of the silicon substrate composing the element Q22, which is a reverse-blocking IGBT; ϵox is a permittivity of the gate oxide film of the element Q22, which is a reverse-blocking IGBT; tox is a thickness of the gate oxide film; d is a width of a depletion layer in the element Q22, which is a reverse-blocking IGBT; and S is an opposing area of the gate electrode and the collector electrode.

A collector-emitter voltage Vce of the element Q22, which is a reverse-blocking IGBT, is given by the formula (3) below:

$$Vce = [qNd/(2\epsilon si)]d^2 \quad (3)$$

where q is an elementary charge; and Nd is a donor concentration in a drift region of the element Q22, which is a reverse-blocking IGBT.

Because the width d of the depletion layer is much larger than the thickness tox of the gate oxide film when a voltage of several tens of volts is applied between the collector and emitter of the element Q22, which is a reverse-blocking IGBT, the feedback capacitance Cgc reduces to the following formula (4):

$$Cgc = \epsilon si S/d \quad (4)$$

The gate current Ig in this condition is represented by the formula (5) below:

$$Ig = -A\, dVce^{1/2}/dt$$

$$A = SVge(\epsilon si\, qNd/2)^{1/2} \quad (5)$$

It can be known from the equation (5) above that the collector-emitter voltage Vce on the element Q22, which is a reverse-blocking IGBT, increases when the gate current Ig is negative. The increase in the collector-emitter voltage Vce, which is also referred to as a collector voltage, continues until the gate current Ig changes over to positive or the element Q22, which is a reverse-blocking IGBT, suffers an avalanche breakdown.

If the induced electromotive force ΔV is small and the negative gate current Ig does not flow in the element Q22, which is a reverse-blocking IGBT, the forward recovery does not occur in the element Q22, which is a reverse-blocking IGBT. In this case, upon completion of turning OFF of the semiconductor switching element Q2, the current I that has been flowing through the semiconductor switching element Q2 circulates from the element Q22, which is a reverse-blocking IGBT, through the load RL, which is a main inductance Lm.

Figure 6:
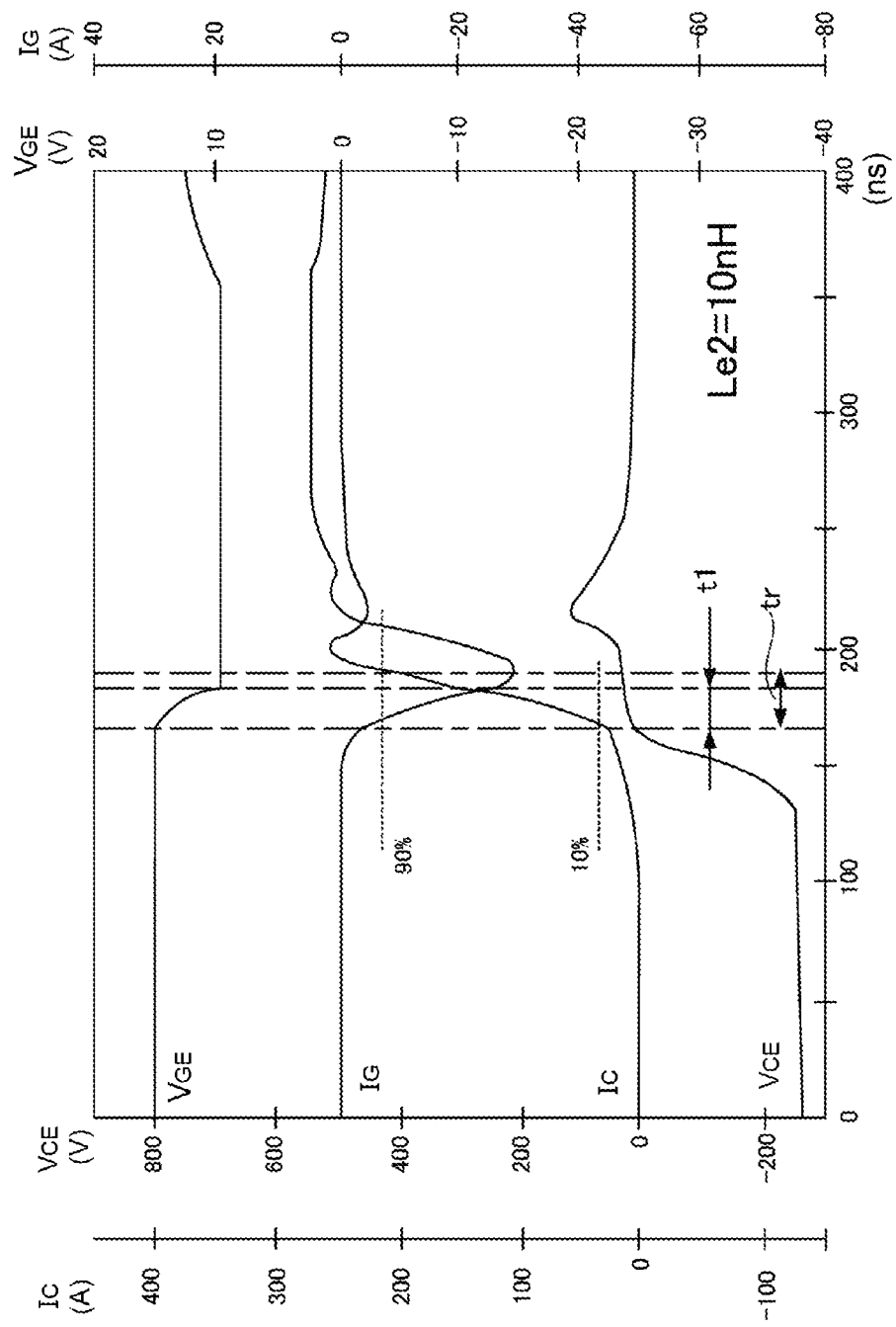
FIG. 6 shows variation of voltage and current in an event of abnormal voltage in a forward recovery of the bidirectional switch S1.

FIG. 6 shows variation of current and voltage in the element Q22, which is a reverse-blocking IGBT, indicating abnormal voltage rise in a forward recovery process. FIG. 6 shows an experimental data obtained with parameters of: an emitter inductance Le2 of the element Q22, which is a reverse-blocking IGBT, of 10 nH, a gate capacitance Cg of 5 nF, a gate resistance Rg2 of 5Ω, a gate threshold voltage Vg(th) of 10 V, wherein a gate voltage Vg of 15 V is applied at the start of turning OFF.

In the example of characteristics shown in FIG. 6, the forward recovery di/dt turns out to be about 3,000 A/μs based on the change of collector current Ic in the element Q22, which is a reverse-blocking IGBT, from 10% to 90% in a period tr. Since the emitter inductance Le2 of the element Q22, which is a reverse-blocking IGBT, is 10 nH as mentioned above, the induced electromotive force ΔV generated between the emitter and collector of the element Q22, which is a reverse-blocking IGBT, is about 10 nH×3,000 A/μs=30 V. As a consequence, it can be supposed that the voltage between the emitter and gate of the element Q22, which is a reverse-blocking IGBT, has decreased transiently from about 15 V to −15 V. This voltage drop has made the element Q22, which is a reverse-blocking IGBT, difficult to be in an ON state, which can be attributed to the abnormal voltage rise due to forward recovery.

In the example of FIG. 6, at 140 ns after start of turning OFF of the semiconductor switching element Q2, which is an IGBT, forward recovery di/dt of the element Q22, which is a reverse-blocking IGBT, appears and at the same time, the gate voltage Vg of the element Q22, which is a reverse-blocking IGBT, begins to decrease. And further at the same time, a negative current begins to flow from the gate of the element Q22, which is a reverse-blocking IGBT. Then at the time 180 ns, the gate voltage Vg of the element Q22, which is a reverse-blocking IGBT, becomes to 10 V that is a voltage to cause current flow of 100 A through the reverse-blocking IGBT Q22. After that, a minor period follows. The collector voltage Vice of the element Q22, which is a reverse-blocking IGBT, continues to rise. At the time of 200 ns, while the forward recovery di/dt disappears, a negative current continues to flow, although decreasing the magnitude, through the gate of the element Q22, which is a reverse-blocking IGBT. At the time 210 ns, the collector voltage Vce abruptly rises. At the time 220 ns, the gate current changes to positive and the collector voltage Vce begins decreasing.

Figure 7:
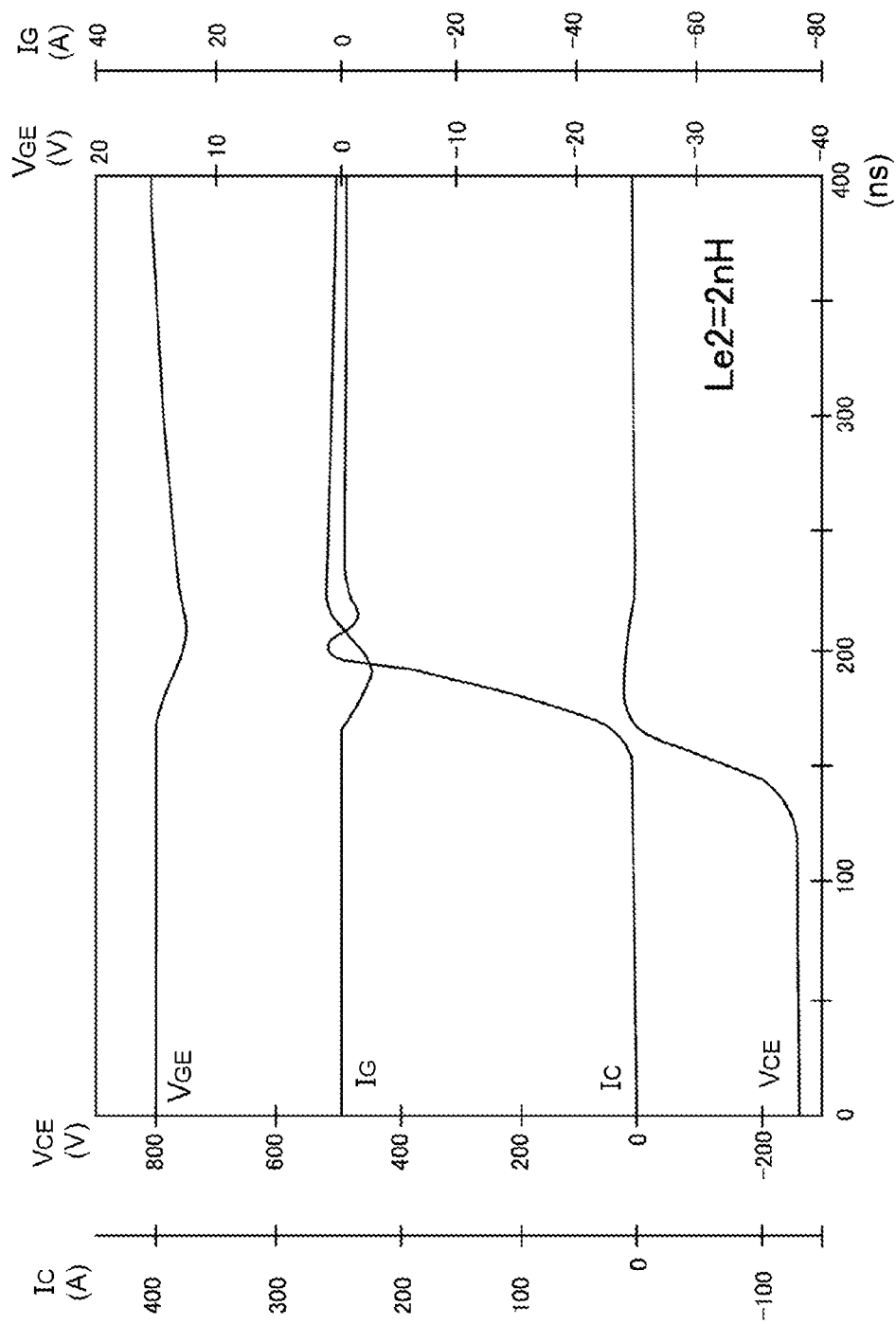
FIG. 7 shows variation of voltage and current when the abnormal voltage in a forward recovery is avoided by reducing an emitter inductance of the bidirectional switch S1.
Figure 8:
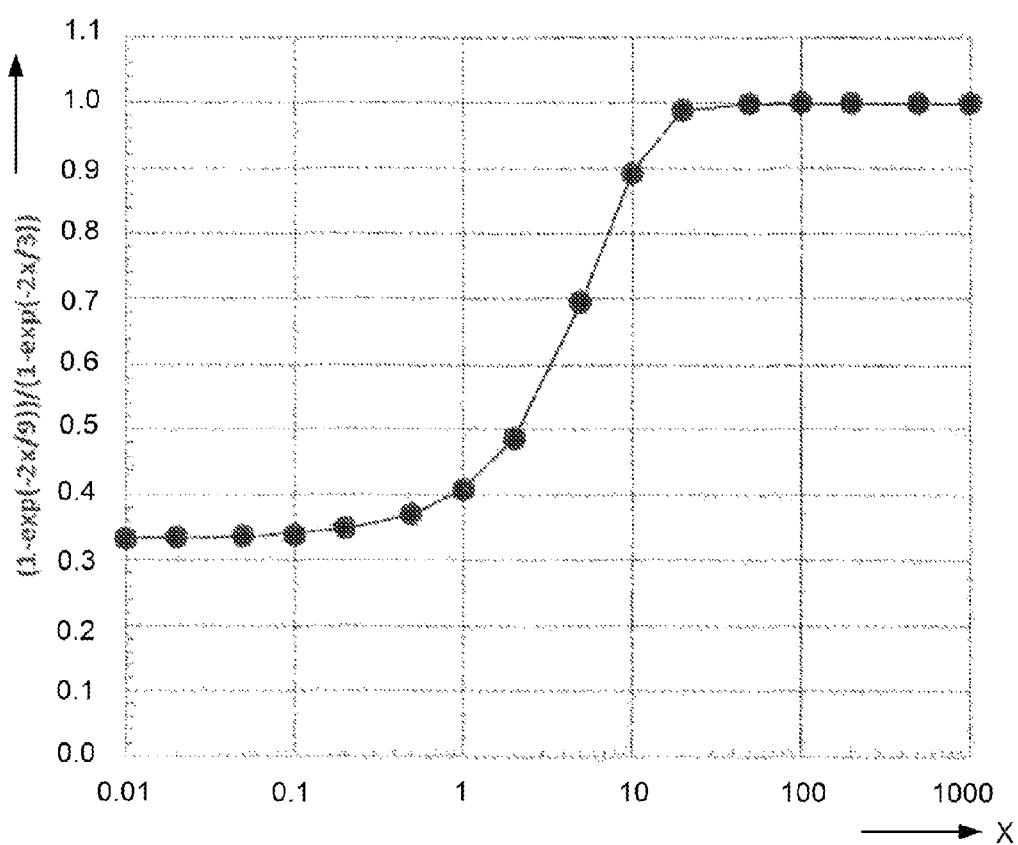
FIG. 8 shows variation of the ratio β/γ in a forward recovery.

In contrast to the abnormal voltage rise in the forward recovery as described above, the similar circuit construction except that the emitter inductance Le2 is reduced to 2 nH has exhibited current and voltage variation as shown in FIG. 7. In this case, the induced electromotive force ΔV generated between the emitter and collector of the element Q22, which is a reverse-blocking IGBT, is 2 nH×3,000 A/μs=6 V. Thus, it can be supposed in this case that the emitter-gate voltage of the element Q22, which is a reverse-blocking IGBT, has become transiently from 15 V to only 9 V. Taking account of time constants of the gate, the voltage applied to the gate of the element Q22, which is a reverse-blocking IGBT, does not decreases to less than the gate threshold voltage Vg(th)=10 V as explained later. Therefore, the forward recovery does not occur and accordingly, the abnormal voltage rise does not appear.

The present invention has been made based on an analysis of the abnormal voltage rise as described above in the process of forward recovery in the bidirectional switch S1. The present invention is characterized in that the abnormal voltage rise in the process of forward recovery in the element Q22, which is a reverse-blocking IGBT composing the bidirectional switch, is avoided by suppressing turning OFF of the element Q22, which is a reverse-blocking IGBT, upon turning OFF of the semiconductor switching element Q2, which is an IGBT.

More specifically, such a condition is produced that the difference Vg−ΔV between a gate voltage Vg and an induced electromotive force ΔV is not larger than a gate threshold voltage Vg(th), wherein the gate voltage Vg is a voltage undergone by the gate of the element Q22, which is a reverse-blocking IGBT, at a start of a forward recovery process; the induced electromotive force ΔV is a voltage developed across the element Q22, which is a reverse-blocking IGBT, in the forward recovery process; and the gate threshold voltage Vg(th) is a voltage allowing to flow the maximum recovery current through the bidirectional switch. Thus, the following formula (6) below holds:

$$Vg - \Delta V \leq Vg(th)$$

$$\Delta V = Le \, di/dt \quad (6)$$

This condition setting suppresses turning OFF of the element Q22, which is a reverse-blocking IGBT composing the bidirectional switch, upon turning OFF of the semiconductor switching element Q2, which is an IGBT.

As clearly shown by the characteristics of the voltage and current variation of FIGS. 6 and 7, setting such a circuit condition that satisfies the above-described condition allows effectively avoiding a phenomenon in which the element Q22, which is a reverse-blocking IGBT, falls into a forward recovery state and generates abnormal voltage rise upon turning OFF of the semiconductor switching element Q2, which is an IGBT. In addition, even though forward recovery has occurred in the element Q22, which is a reverse-blocking IGBT, the abnormal voltage rise can be suppressed in the element Q22, which is a reverse-blocking IGBT, by delaying decrease in the gate voltage with an appropriate time constant determined by the gate resistance Rg2 and the gate capacitance Cge. Therefore, setting the circuit condition to satisfy the above-described condition is very useful for preventing the element Q22, which is a reverse-blocking IGBT, from breakdown of the device due to overheating in the element Q22, which is a reverse-blocking IGBT.

Even in the case the above-described condition is not satisfied, it is also effective to control the induced electromotive force ΔV sufficiently low during the period until turning OFF of the semiconductor switching element Q2, which is an IGBT, completes, wherein the induced electromotive force ΔV is determined by an inductance Le of the bidirectional switch and a forward recovery di/dt, which is time variation di/dt of a forward recovery current until reaching the maximum forward recovery current value. More specifically, the time constant that is determined by the gate resistance and the gate capacitance, which is a feedback capacitance Cgc, of the element Q22, which is a reverse-blocking IGBT, can be increased, to delay the rate of rising the induced electromotive force ΔV. By this means, the gate voltage of the element Q22, which is a reverse-blocking IGBT, can be maintained not to decrease below the gate threshold voltage Vg(th) in the turning OFF period of the semiconductor switching element Q2, which is an IGBT.

A gate voltage Vg varies with time t passed from beginning of emerging of the induced electromotive force ΔV according to the equations below:

$$Vg = Vgo - \Delta VA$$

$$A = 1 - \exp[-t/(RgCg)]. \quad (7)$$

Substituting this equation into the formula (6) and reducing for the time tr that is the time period the forward recovery di/dt is being generated, which is the time period until reaching the maximum forward recovery current, the following condition is obtained under which the gate voltage of the element Q22, which is a reverse-blocking IGBT, does not decrease below the gate threshold voltage Vg(th):

$$Vg(th) \leq Vgo - \Delta V\alpha$$

$$\alpha = 1 - \exp[-tr/(RgCg)], \quad (8)$$

or $$Le \leq (1/di/dt)[(Vgo - Vg(th))/\alpha]$$

$$\alpha = 1 - \exp[-tr/(RgCg)]. \quad (9)$$

Therefore, abnormal voltage rise due to the forward recovery current can be avoided in the period the forward recovery current is varying if the condition represented by the formula (8) or (9) is satisfied.

The circuit condition that results in the characteristics of the voltage and current variation of FIG. 7 is as described previously: a gate capacitance Cg of 5 nF, a gate resistance Rg2 of 5Ω, a gate threshold voltage Vg(th) of 10 V, a gate voltage Vgo at the beginning of turning OFF of 15 V. Entering these parameters into the formula (9), an inequality Le≤2.5 nH is obtained. In the circuit conditions of FIG. 7, the emitter inductance Le2 is a small value of 2 nH and thus satisfies the condition of the formula (9). Therefore, it has been confirmed that the condition of formula (9) avoids abnormal voltage rise in the forward recovery process as shown in FIG. 7.

The collector voltage rise in the process of forward recovery does not occur immediately after the gate voltage reaches the gate threshold voltage Vg(th). The collector voltage increases delaying with a time constant determined by parameters including the feedback capacitance Cgc and the gate resistance Rg of the element Q22, which is a reverse-blocking IGBT, as shown in the equation (5). Actual delay of the rise up of the collector voltage depends on the properties of the element Q22, which is a reverse-blocking IGBT, and thus, difficult to be uniquely determined. However, observing the experimental data shown in FIG. 6, the time to begin a significant rise in the collector voltage in the forward recovery process can be estimated about three times the time for the gate voltage Vg to decrease to the gate threshold voltage Vg(th).

From this observation, it can be supposed that an induced electromotive force ΔV' has developed causing the gate voltage Vg to decrease down to the gate threshold voltage Vg(th) required to generate the forward recovery current in about one third of the time for beginning of significant rise of the collector voltage. This induced electromotive force ΔV' can be represented using the ΔV as follows:

$$\Delta V' = \Delta V(X/Y)$$

$$X = 1-\exp[-t1/(RgCg)]$$

$$Y = 1-\exp[-(1/3)t1/(RgCg)] \qquad (10)$$

The time t1 in the equation (10) is, at most, shorter than the time tr during which the forward recovery di/dt is being generated. In the characteristics of the voltage and current variation shown in FIG. 6, the abnormal voltage rise in the forward recovery process occurs at the time $t1 \approx (2/3)tr$. Consequently, the abnormal voltage rise is highly possible to occur in the period of time $t1 \leq (2/3)tr$. Using the condition of $t1 \approx (2/3)tr$ in the formula (10), abnormal voltage rise in the forward recovery process is apt to occur in the following condition:

$$\Delta V' \geq \Delta V(\gamma/\beta)$$

$$\beta = 1-\exp[-(2/9)tr/(RgCg)]$$

$$\gamma = 1-\exp[-(2/3)tr/(RgCg)] \qquad (11)$$

Substituting the induced electromotive force $\Delta V'$ of the equation (10) into the formula (8), a condition for avoiding the abnormal voltage rise in the forward recovery process is obtained as follows:

$$Vg(th) \geq Vgo - \Delta V'(\beta/\gamma)\alpha$$

$$\alpha = 1-\exp[-tr/(RgCg)]$$

$$\beta = 1-\exp[-(2/9)tr/(RgCg)]$$

$$\gamma = 1-\exp[-(2/3)tr/(RgCg)]$$

$$\Delta V' = Ledi/dt \qquad (12)$$

The ratio ($\beta/\gamma$) takes a value between 1/3 and 1 in the range of $0 < tr/(RgCg) < \infty$. Adding this condition, the formula (12) can be simplified to:

$$Vg(th) < Vgo - (1/3)\Delta V'\alpha$$

$$\alpha = 1-\exp[-tr/(RgCg)]$$

$$\Delta V' = Ledi/dt \qquad (13)$$

While this condition of formula (13) is more gentle than the condition of formula (12), the circuit condition satisfying the condition of formula (13) sufficiently avoids the abnormal voltage rise in the forward recovery.

Figure 9:
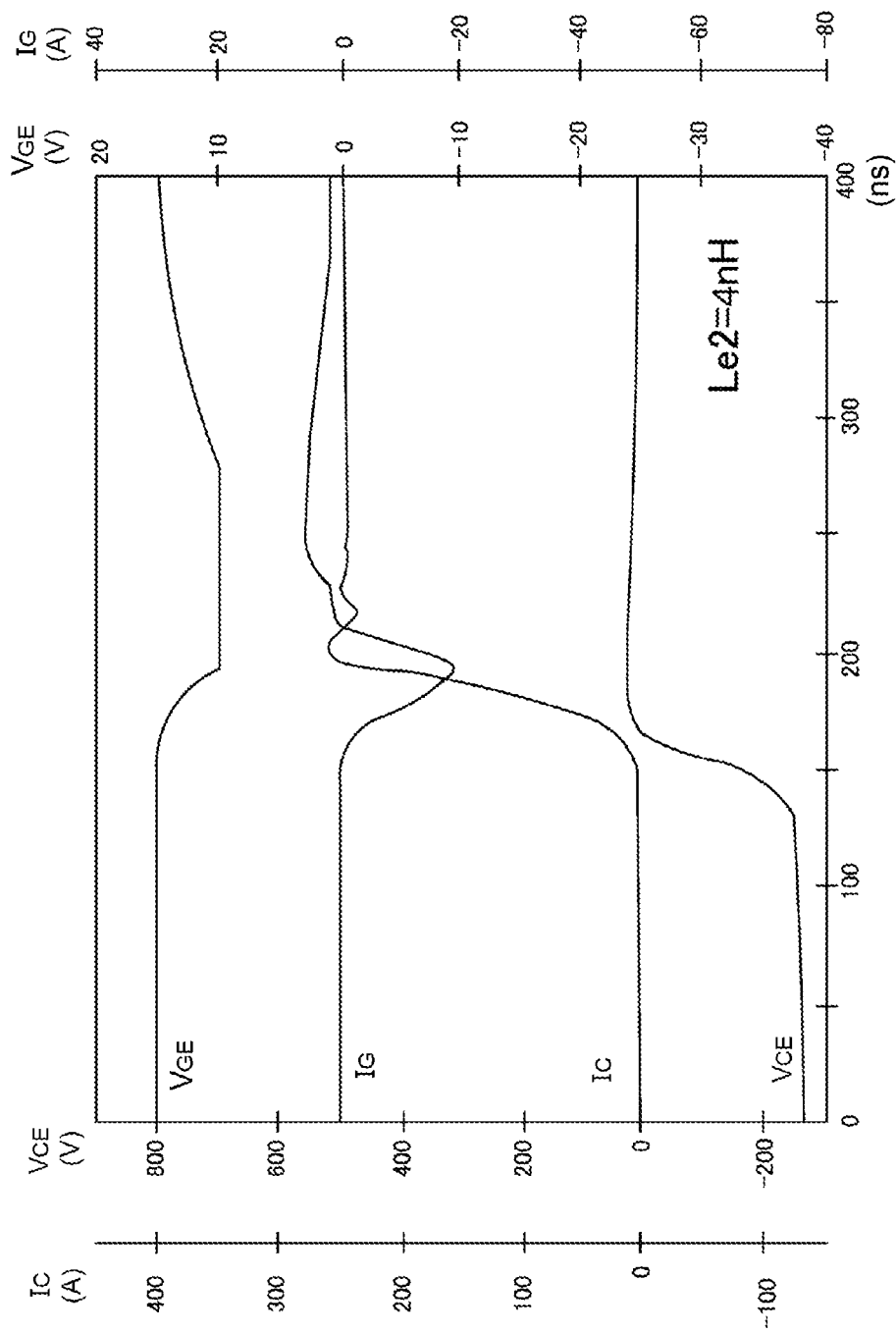
FIG. 9 shows variation of voltage and current when the abnormal voltage in a forward recovery is avoided by anticipating delay of collector voltage rise of the bidirectional switch S1.

Using the circuit conditions of: gate capacitance Cg of 5 nF, a gate resistance Rg2 of 5Ω, a gate threshold voltage Vg(th) of 10 V, and a gate voltage Vgo at the beginning of turning OFF of 15 V, the condition of formula (12) gives a calculation result Le≤6.5 nH. The condition of formula (13) gives a calculation result Le≤7.5 nH. FIG. 9 shows a voltage-current characteristics in the case of an emitter inductance Le2 of 4 nH. This example assures that setting such a circuit condition that satisfies the condition of formula (12) or formula (13) avoids the abnormal voltage rise in a forward recovery process.

The study described above is based on the fact that the abnormal voltage rise in the forward recovery process is avoided by reducing the emitter inductance Le of the element Q22, which is a reverse-blocking IGBT, composing a bidirectional switch S1. Instead of reducing the emitter inductance Le, the abnormal voltage rise can be avoided as well by increasing a gate resistance Rg and a gate input capacitance Cg of the element Q22, which is a reverse-blocking IGBT.

It is clear that the gate voltage Vg required by generating the forward recovery di/dt or producing the forward recovery current becomes maximum when the semiconductor switching element Q2 interrupts the maximum current. As a consequence, the abnormal voltage rise in a forward recovery process can be avoided when the difference Vgo−Vg(th) satisfies the condition below:

$$Vgo - Vg(th) \geq \Delta V\max \alpha \qquad (12')$$

$$Vgo - Vg(th) \geq \Delta V\max (\beta/\gamma)\alpha \qquad (12')$$

$$Vgo - Vg(th) \geq (1/3)\Delta V\max \alpha \qquad (10')$$

$$Vgo - Vg(th) \geq \Delta V\max \alpha \qquad (7')$$

$$Vgo - Vg(th) \geq \Delta V\max \qquad (6')$$

wherein the Vg(th) is the gate voltage when the semiconductor switching element Q2 has interrupted the maximum current, and the Vgo is the gate voltage at the moment of starting the forward recovery.

In the formulas (12'), (10'), (7'), and (6'), $$\alpha = 1-\exp[-tr/(RgCg)]$$

$$\beta = 1-\exp[-(2/9)tr/(RgCg)]$$

$$\gamma = 1-\exp[-(2/3)tr/(RgCg)]$$

$$\Delta V\max = Le(di\max/dt).$$

It can be noted that the conditions are more severe in the order of formulas (12'), formula (10'), formula (7'), and formula (6').

Considering the fact that a reverse-blocking IGBT of a normally OFF type is generally used for the element Q22 composing the bidirectional switch S1, and the gate driving voltage for the element Q22 is generally 15 V, a relationship Vgo−Vg(th)≤15 V results from the inequality Vg(th)≥0 V. Consequently, the formula (12') can be reduced to the formula (13') below:

$$Le \leq [15/(di\max/dt)][\gamma/(\beta\alpha)] \qquad (13')$$

Therefore, the abnormal voltage rise in a forward recovery process can be avoided by selecting a gate resistance Rg, an emitter inductance Le, a gate input capacitance Cg, or a forward recovery dimax/dt of the element Q22, which is a reverse-blocking IGBT composing the bidirectional switch S1, to satisfy the formula (13').

Like the formula (13'), the formulas (10'), (7'), and (6') can also be rewritten as follows:

$$Le \leq [45/(di\max/dt)](1/\alpha) \qquad (14)$$

$$Le < [15/(di\max/dt)](1/\alpha) \qquad (15)$$

$$Le < 15/(di\max/dt) \qquad (16)$$

Therefore, abnormal voltage rise in a forward recovery process can be avoided by selecting the gate resistance Rg, an emitter inductance Le, and a gate input capacitance Cg of the element Q22, which is a reverse-blocking IGBT, composing the bidirectional switch S1, or the forward recovery dimax/dt so that the formulas (14), (15), and (16) are satisfied.

The present invention should not be limited to the embodiment described thus far. For example, it is effective to insert a capacitor between the gate and the emitter of the element Q22, which is a reverse-blocking IGBT composing the bidirectional switch S1, thereby increasing a gate input capacitance. The conditions described above can be satisfied by setting the initial gate voltage Vg higher than the gate driving voltage of 15 V in the normal operation. This increase of the gate driving voltage in the gate driving circuit can be carried out before the start of the forward recovery process or during the forward recovery process of the element Q22, which is a reverse-blocking IGBT composing the bidirectional switch S1.

Figure 10A:
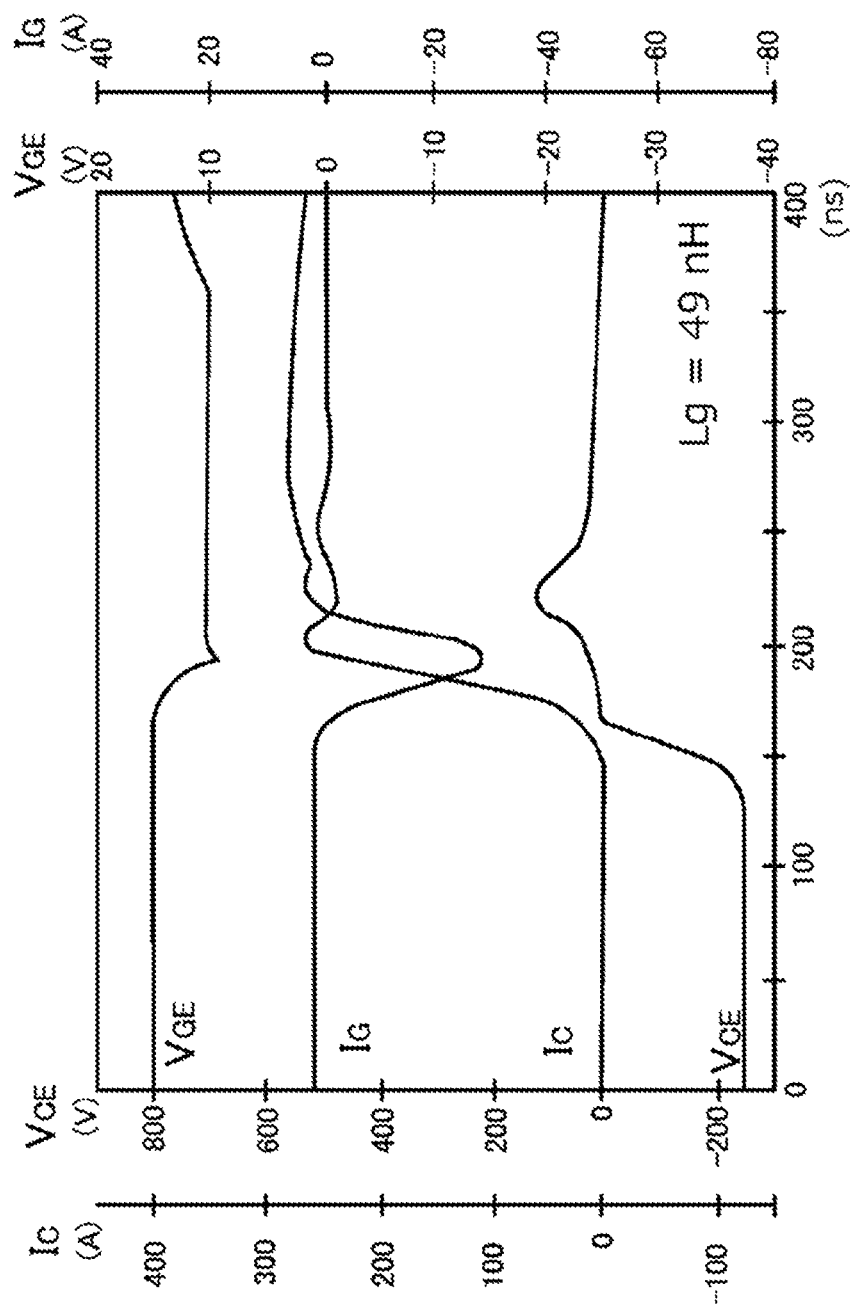
Figure 10B:
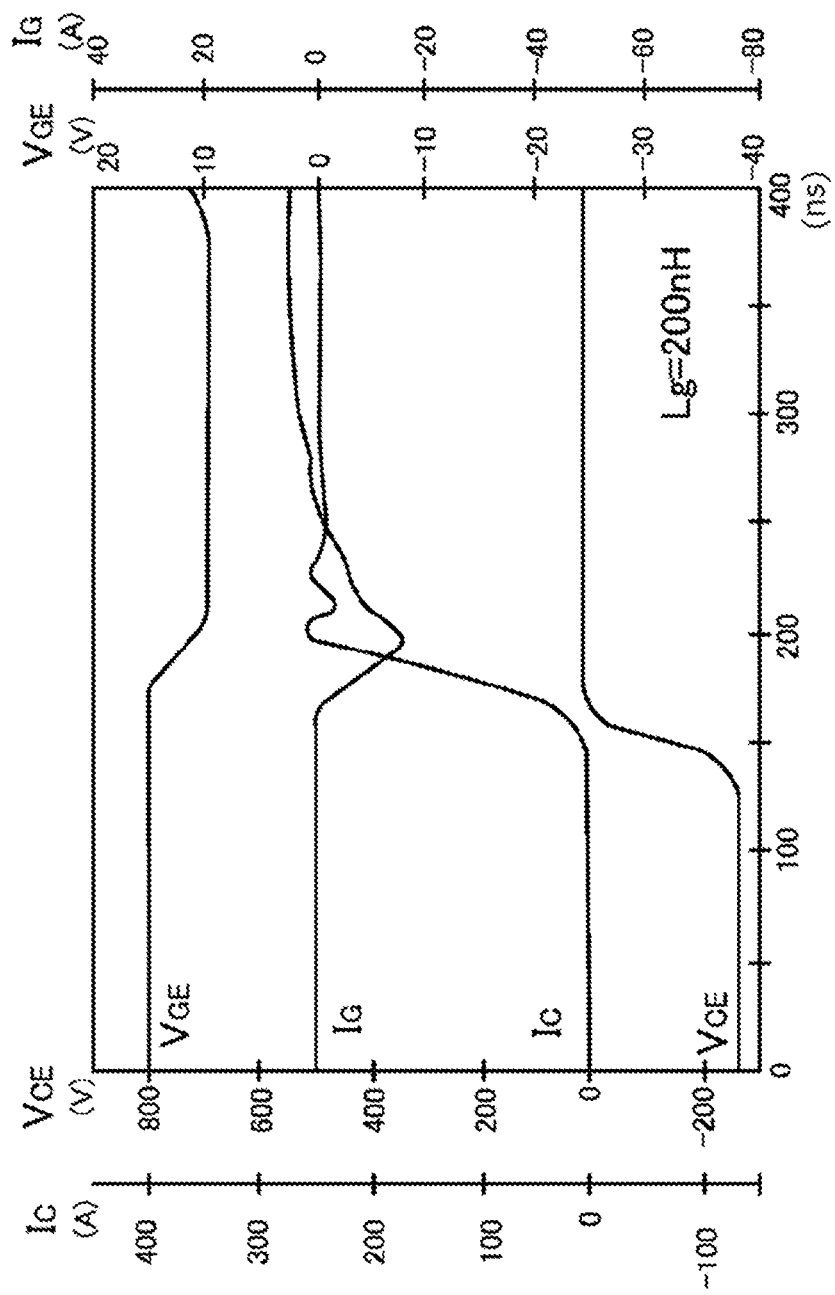

It is also useful to increase the gate inductance Lg2 of the element Q22, which is a reverse-blocking IGBT composing the bidirectional switch S1, although the gate inductance Lg2 is generally determined at a minimum value. FIGS. 10A, 10B, and 10C show voltage and current variation in comparison between the cases of gate inductances Lg2 of 49 nH, 200 nH, and 500 nH of the element Q22, which is a reverse-blocking IGBT. As shown in FIGS. 10A, 10B, and 10C, increase in the gate inductance Lg2 of the element Q22, which is a reverse-blocking IGBT, avoids abnormal voltage rise in the forward recovery process. This is because an induced electromotive force $\Delta V2 = Lg2 \, (dig/dt)$ emerges in the direction to hinder the decrease in the gate voltage.

The present invention can be applied to an inverter composed of MOS-FETs and reverse-blocking MOS-FETs in place of the IGBTs and reverse-blocking IGBTs. The invention can of course be applied to a five-level inverter as well as a three-level inverter. The present invention can be implemented with various modifications without deviating from the spirit and scope of the invention.

DESCRIPTION OF SYMBOLS

Q1 through Q6: semiconductor switching element, which can be an IGBT
D1 through D6: free-wheeling diode
S1, S2, S3: bidirectional switch
Q21, Q22: reverse blocking IGBT
RL: load

What is claimed is:

1. A power converter for use with a power supply, comprising:
   a pair of semiconductor switching elements that are connected in series to form a half-bridge and are ON/OFF-driven in a predetermined relationship with each other to switch a DC voltage provided by the power supply;
   free-wheeling diodes that are connected anti-parallel with the respective switching elements; and
   a bidirectional switch that is interposed between the power supply and a middle point of the half-bridge to clamp one of the semiconductor switching elements to a middle potential point of the DC voltage,
   wherein an induced electromotive force, generated during a forward recovery process of the bidirectional switch upon turning said one of the semiconductor switching elements OFF, is controlled to be below a difference between a gate voltage of said one of the semiconductor switching elements at a moment that the forward recovery process of the bidirectional switch starts and a gate threshold voltage of said one of the semiconductor switching elements that allows a maximum forward recovery current of the bidirectional switch to flow.

2. The power converter according to claim 1, wherein the semiconductor switching element is an IGBT or MOS-FET, and the bidirectional switch is a pair of reverse-blocking IGBTs or reverse-blocking MOS-FETs connected anti-parallel with each other.

3. The power converter according to claim 1, wherein the induced electromotive force generated in the forward recovery process of the bidirectional switch is obtained from a product of a forward recovery rate of the bidirectional switch depending on a turning OFF rate of said one of the semiconductor switching elements and an inductance of the bidirectional switch, and the induced electromotive force is made lower than the difference between the gate voltage of said one of the semiconductor switching elements and the gate threshold voltage of said one of the semiconductor switching elements.

4. The power converter according to claim 1, wherein the pair of semiconductor switching elements is a first pair of semiconductor switching elements, the free-wheeling diodes are first free-wheeling diodes, and the bidirectional switch is a first bidirectional switch, and further comprising:
   a second pair of semiconductor switching elements that are connected in series to form a half-bridge, the second pair of semiconductor switching elements being connected in parallel with the first pair of semiconductor switching elements;
   second free-wheeling diodes that are connected anti-parallel with the respective semiconductor switching elements of the second pair of semiconductor switching elements;
   a second bidirectional switch that is interposed between the power supply and the middle point of the-bridge formed by the semiconductor switching elements of the second pair of semiconductor switching elements to clamp one of the semiconductor switching elements of the second pair to the middle potential point of the DC voltage;
   a third pair of semiconductor switching elements that are connected in series to form a half-bridge, the second pair of semiconductor switching elements being connected in parallel with the first and second pairs of semiconductor switching elements;
   third free-wheeling diodes that are connected anti-parallel with the respective semiconductor switching elements of the third pair of semiconductor switching elements; and
   a third bidirectional switch that is interposed between the power supply and the middle point of the-bridge formed by the semiconductor switching elements of the second semiconductor switching elements to clamp one of the semiconductor switching elements of the third pair to the middle potential point of the DC voltage.

5. A power converter for use with a power supply, comprising:
   a pair of semiconductor switching elements that are connected in series to form a half-bridge and are ON/OFF-driven in a predetermined relationship with each other to switch a DC voltage provided by the power supply;
   free-wheeling diodes that are connected anti-parallel with the respective switching elements; and
   a bidirectional switch that is interposed between the power supply and a middle point of the half-bridge to clamp one of the semiconductor switching element to a middle potential point of the DC voltage;
   wherein the power converter satisfies the following relationships when a delay time of a collector voltage rise in the bidirectional switch in a forward recovery process is about three times as long as a time period in which a gate voltage Vg of the bidirectional switch at a moment that the forward recovery process of the bidirectional switch starts upon turning said one of the semiconductor switching elements OFF falls down to a gate threshold voltage Vg(th) of said one of the semiconductor switching elements that allows to flow maximum forward recovery current of the bidirectional switch:

$Vg - Vg(th) \geq Ledi/dt(\beta/\gamma)\alpha$ $\alpha = 1 - \exp[-tr/(RgCg)]$ $\beta = 1 - \exp[-(\frac{2}{3})tr/(RgCg)]$ $$\gamma=1-\exp[-(2/3)tr/(RgCg)]$$

where Le is an inductance of the bidirectional switch, di/dt is a time variation of a forward recovery current until a maximum forward recovery current is reached, tr is a time period until the maximum forward recovery current is reached, Rg is a gate resistance of the bidirectional switch, and Cg is a gate input capacitance of the bidirectional switch.

6. The power converter according to claim 5, wherein the power converter satisfies following relationships when the delay time of a collector voltage rise of the bidirectional switch in the forward recovery process is about three times as long as a time period in which the gate voltage Vg of the bidirectional switch at the moment that the forward recovery process of the bidirectional switch starts upon turning said one of the semiconductor switching elements OFF falls down to the gate threshold voltage Vg(th):

$$Vg-Vg(th) \geq (1/3)Ledi/dt\alpha$$

$$\alpha=1-\exp[-tr/(RgCg)].$$

7. The power converter according to claim 5, wherein the relationships in the power converter are actualized by increasing a gate-emitter voltage or a gate-source voltage in the bidirectional switch over a period when the forward recovery current varies with time from immediately before the forward recovery of the bidirectional switch flows.

8. The power converter according to claim 7, wherein the gate-emitter voltage or the gate-source voltage of the bidirectional switch is increased by increasing a time constant of a gate circuit for the bidirectional switch.

9. The power converter according to claim 7, wherein the gate-emitter voltage or the gate-source voltage of the bidirectional switch is increased by interposing a capacitor between the gate and emitter or between the gate and source of the bidirectional switch.

10. The power converter according to claim 7, wherein the gate-emitter voltage or the gate-source voltage of the bidirectional switch is increased by adding an inductance component to the gate circuit of the bidirectional switch.

11. The power converter according to claim 5, wherein the pair of semiconductor switching elements is a first pair of semiconductor switching elements, the free-wheeling diodes are first free-wheeling diodes, and the bidirectional switch is a first bidirectional switch, and further comprising:
a second pair of semiconductor switching elements that are connected in series to form a half-bridge, the second pair of semiconductor switching elements being connected in parallel with the first pair of semiconductor switching elements;
second free-wheeling diodes that are connected anti-parallel with the respective semiconductor switching elements of the second pair of semiconductor switching elements;
a second bidirectional switch that is interposed between the power supply and the middle point of the-bridge formed by the semiconductor switching elements of the second of the second pair of semiconductor switching elements to clamp one of the semiconductor switching elements of the second pair to the middle potential point of the DC voltage;
a third pair of semiconductor switching elements that are connected in series to form a half-bridge, the second pair of semiconductor switching elements being connected in parallel with the first and second pairs of semiconductor switching elements;
third free-wheeling diodes that are connected anti-parallel with the respective semiconductor switching elements of the third pair of semiconductor switching elements; and
a third bidirectional switch that is interposed between the power supply and the middle point of the-bridge formed by the semiconductor switching elements of the second semiconductor switching elements to clamp one of the semiconductor switching elements of the third pair to the middle potential point of the DC voltage.

12. A power converter for use with comprising:
a pair of semiconductor switching elements that are connected in series to form a half-bridge and are ON/OFF-driven in a predetermined relationship with each other to switch a DC voltage of the power supply;
free-wheeling diodes that are connected anti-parallel with the respective switching elements; and
a bidirectional switch that is interposed between the power supply and a middle point of the half-bridge to clamp one of the semiconductor switching elements to a middle potential point of the DC voltage,
wherein the power converter satisfies the following relationships:

$$Vg-Vg(th) \geq Ledi/dt\alpha$$

$$\alpha=1-\exp[-tr/(RgCg)]$$

where Vg is a gate voltage of the bidirectional switch at a moment when the forward recovery process of the bidirectional switch starts upon turning said one of the semiconductor switching elements OFF, Vg(th) is a gate threshold voltage that allows a maximum forward recovery current of the bidirectional switch to flow, Le is an inductance of the bidirectional switch, di/dt is a time variation of a forward recovery current until a maximum forward recovery current is reached, tr is a time period until the maximum forward recovery current is reached, Rg is a gate resistance of the bidirectional switch, and Cg is a gate input capacitance of the bidirectional switch.

13. The power converter according to claim 12, wherein a condition to control an induced electromotive force generated upon turning said one of the semiconductor switching elements OFF is that a difference between the gate voltage and the gate threshold voltage is given to satisfy a following relationship:

$$Vg-Vg(th) \geq Ledi/dt$$

where Vg is a gate voltage of the bidirectional switch at the moment that the forward recovery process starts, Vg(th) is the gate threshold voltage of the bidirectional switch, Le is the inductance of the bidirectional switch, and di/dt is the time variation of the forward recovery current until a maximum forward recovery current is reached.

14. The power converter according to claim 12, wherein the relationships in the power converter are actualized by increasing a gate-emitter voltage or a gate-source voltage in the bidirectional switch over a period when the forward recovery current varies with time from immediately before the forward recovery of the bidirectional switch.

15. The power converter according to claim 14, wherein the gate-emitter voltage or the gate-source voltage of the bidirectional switch is increased by increasing a time constant of a gate circuit for the bidirectional switch.

16. The power converter according to claim 14, wherein the gate-emitter voltage or the gate-source voltage of the bidirectional switch is increased by interposing a capacitor between the gate and emitter or between the gate and source of the bidirectional switch.

17. The power converter according to claim 14, wherein the gate-emitter voltage or the gate-drain voltage of the bidirectional switch is increased by adding an inductance component to the gate circuit of the bidirectional switch.

18. The power converter according to claim 12, wherein the pair of semiconductor switching elements is a first pair of semiconductor switching elements, the free-wheeling diodes are first free-wheeling diodes, and the bidirectional switch is a first bidirectional switch, and further comprising:

- a second pair of semiconductor switching elements that are connected in series to form a half-bridge, the second pair of semiconductor switching elements being connected in parallel with the first pair of semiconductor switching elements;
- second free-wheeling diodes that are connected anti-parallel with the respective semiconductor switching elements of the second pair of semiconductor switching elements;
- a second bidirectional switch that is interposed between the power supply and the middle point of the-bridge formed by the semiconductor switching elements of the second pair of semiconductor switching elements to clamp one of the semiconductor switching elements of the second pair to the middle potential point of the DC voltage;
- a third pair of semiconductor switching elements that are connected in series to form a half-bridge, the second pair of semiconductor switching elements being connected in parallel with the first and second pairs of semiconductor switching elements;
- third free-wheeling diodes that are connected anti-parallel with the respective semiconductor switching elements of the third pair of semiconductor switching elements; and
- a third bidirectional switch that is interposed between the power supply and the middle point of the-bridge formed by the semiconductor switching elements of the second semiconductor switching elements to clamp one of the semiconductor switching elements of the third pair to the middle potential point of the DC voltage.

* * * * *